US005702812A

United States Patent [19]

Bracken et al.

[11] Patent Number: 5,702,812

[45] Date of Patent: Dec. 30, 1997

[54] COMPLIANT DOCTOR BLADE

[75] Inventors: Peter W. Bracken; Jeffery R. Brener; Martin V. DiGirolamo; Sam E. Mullinix, Jr.; Donald W. Stafford; Peter E. Wallin, all of Lexington, Ky.

[73] Assignee: Lexmark International, Inc., Lexington, Ky.

[21] Appl. No.: 623,363

[22] Filed: Mar. 28, 1996

[51] Int. Cl.[6] .......... B32B 5/02

[52] U.S. Cl. .......... 428/323; 118/657; 118/653; 399/284; 399/274

[58] Field of Search .......... 399/274, 284; 428/323; 118/657, 653

[56] References Cited

U.S. PATENT DOCUMENTS

| | | | |
|---|---|---|---|
| 4,637,340 | 1/1987 | Thompson et al. | 118/657 |
| 5,085,171 | 2/1992 | Aulick et al. | 118/653 |
| 5,607,726 | 3/1997 | Flattery et al. | 427/261 |
| 5,623,718 | 4/1997 | Bracken et al. | 399/284 |

*Primary Examiner*—E. Rollins Buffalow
*Attorney, Agent, or Firm*—John A. Brady

[57] ABSTRACT

A compliant doctor blade having excellent toner metering capabilities is disclosed. The doctor blade includes a compliant laminate (3) having a resin film backing layer and carrying a binder which contains abrasive particles, such as silicon carbide particles, and a conducting means. In a preferred embodiment the conducting means are conductive carbon black particles which are contained in the resin binder which also includes the abrasive silicon carbide. The compliant laminate is supported on an aluminum bar (1). The bar has fastened to its bottom face a compliant foam layer (2) which includes on its bottom face a shim (10) having a stiffness of from about 0.5 to about 31.0 inches of deflection/inch of length/pounds of force. The laminate is bent under the foam layer and shim where it contacts the developer roller (6). The conductive layer remains conductive as it wears during use. In addition, this doctor blade minimizes toner buildup in the prenip area and provides effective and uniform metering of the toner on the developer roller.

20 Claims, 2 Drawing Sheets

COMPLIANT DOCTOR BLADE

TECHNICAL FIELD

This invention relates to a component used in electrophotographic toner cartridges and, more particularly, relates to a compliant doctor blade which helps in transferring toner to a developer roller which, in turn, transfers the toner to a photoconductive surface carrying a latent image to be developed by the toner.

BACKGROUND OF THE INVENTION

Commercially available laser printers frequently employ an electrophotographic technique in which toner is charged and brought into contact with the surface of a rotating developer roller which carries metered toner into a nip contact with a photoconductor in the form of a dram having a photoconductive surface. The developer roller is semiconductive and charged to a potential between that on the toner and that on the charged areas of the photoconductor. As the developer roller rotates, toner is attracted to the developer roller surface from a supply source of toner.

When the developer roller surface has left contact with the toner supply and is rotating toward the nip contact with the photoconductor surface, it encounters a doctor blade which is in direct contact with the developer roller surface and which is charged to a potential of the same polarity as desired for toner passing under the doctor blade. The action of the doctor blade provides a controlled, thin layer of toner on the developer roller. This doctor blade in combination with the developer roller is the subject matter of an article entitled "Doctor Blade Design For Monocomponent Nonmagnetic Developer," in the IBM Technical Disclosure Bulletin, Vol. 33, No. 5, October, 1990, at Pages 14–15. The blade described in that article is slightly toughened on the surface contacting the developer roller. Toner brought to the blade is believed to have a significant portion charged in the opposite polarity to that intended for development. The interaction of the blade charged to the intended polarity and the mechanical effect at the contact between the blade and the developer roller results in the toner passing the blade to be highly predominant in the intended charge.

The purpose of the doctor blade, therefore, is twofold: (1) to uniformly meter a thin layer of toner onto the surface of the developer roller as it rotates, and (2) to assist with the uniform charging of the toner on the surface of the developer roller. Properties such as surface roughness, nip force, electrical continuity and wear resistance are important to the proper functioning of the doctor blade. However, the doctor blade described above is rigid along its length and, therefore, provides a toner layer which varies in thickness with surface variations in the doctor blade itself and the developer roller it comes in contact with. Such variations in the toner layer result in corresponding variations in the visible image made by the printer. This results in serious print quality defects, such as horizontal lines and bands. Therefore, an additional highly desirable characteristic of the doctor blade is flexibility at the doctoring nip which allows the blade to conform more fully to the irregular surface of the developer roller. This conformability creates a uniform pressure at the doctoring nip which causes more uniformity in the charging and flow of toner. This results in improved print quality when imaging gray scales.

Flexible doctor blades are known in the art. U.S. Pat. No. 5,085,171, Aulick, et al., issued Feb. 4, 1992, is directed to a compliant doctor blade having a thin metal outer layer on a flexible backing containing a grit surface which contacts the developer roller. The thin metal layer provides electrical conductivity to the blade. This blade, by being flexible rather than rigid as in the prior art doctor blades, conforms more closely to the surface of the developer roller it comes in contact with thereby providing a more uniform layer of toner on the roller. That doctor blade, however, although successfully used, has an effective life limited by the wearing away of the outer metal layer, since the metal provides a necessary electrical path to charge the doctor blade where it contacts the developer roller. Another problem arises from the conformation of this blade in use. Specifically, when this blade is used, the force of the sandpaper layer against the foam layer backing it results in the conductive sandpaper-developer roller nip becoming elongated and curved due to the compliance of the foam. This is in sharp contrast with the nip formed between a steel doctor blade and a developer roller. In that instance, since the steel is not flexible, it is unable to conform to the roller and remains flat in the nip region, providing a short flat nip. The net result of this deformation in the prenip and nip areas results in erratic high and low toner flow. This erratic toner flow produces dark and light regions when printing gray scales and blacks.

An alternative flexible doctor blade design is described in U.S. Pat. No. 5,623,718, Bracken, et al. now U.S. Pat. No. 5,623,718, Extended Life Compliant Doctor Blade, filed Sep. 6, 1995. This structure modifies the Aulick, et al. doctor blade in two respects: (1) the layer which contacts the developer roller includes grit together with conductive filler material contained in a binder resin, rather than the Aulick, et al., thin metal layer on the grit surface; and (2) the supporting member of the blade extends the full height of the blade providing some rigidity around which the grit/conductive layer is bent to contact the roller (thereby minimizing compression of the foam at the nip corner and buildup of toner at that point). However, while this structure eliminates the tunnel shape pre-nip region, it does not change the long radius curved nip and the same erratic high and low toner flow problem results.

It, therefore, would be highly desirable to develop a flexible doctor blade, which is effective for extended use and which conforms along the length of the developer roller, but which provides a prenip and nip configuration which is similar to that provided by an inflexible doctor blade in order to provide optimum toner flow and print characteristics.

SUMMARY OF THE INVENTION

The present invention provides for an electrically energized doctor blade for metering charged electrophotographic toner held on a developer roller by physically contacting a sector of said roller with a surface of said blade which is electrically charged, said blade comprising a compliant backing member, a supporting member to position said blade adjacent to said roller, a compliant foam layer attached to the side of said supporting member facing the developer roller, a shim having a stiffness of from about 0.5 to about 31.0 inches of deflection/inch of length/pound of force attached to the side of the compliant foam layer facing the developer roller, and a layer on said compliant backing member comprising conducting means and a solid binder having dispersed throughout said binder grit particles, said compliant backing member, said conducting means and said layer with grit being attached to said supporting member and being bendable to extend under said foam layer and shim to contact said layer with grit and said conducting means with said sector of said developer roll during use.

The shim may be made of any material which is sufficiently stiff in the process direction to prevent the resilient foam layer from deforming in the prenip region but which allows flexibility in the direction perpendicular to the process direction thereby permitting the blade to conform closely to the surface of the developer roller. Examples of materials which may be used to fabricate the shim include polyester and stainless steel.

BRIEF DESCRIPTION OF THE DRAWINGS

The details of the present invention will be described in connection with the accompanying drawings in which.

DETAILED DESCRIPTION OF THE INVENTION

An improved flexible doctor blade design is described here which has the desired compliance with the developer roller but does not have a funnel shaped prenip and a long, radiused nip region which is seen with flexible doctor blades previously known in the art. This improved doctor blade does not exhibit the erratic high and low toner flow problems seen with such prior art flexible doctor blades. In the present invention a thin piece of shim material is attached to the bottom surface of a resilient foam layer and, in use, resides between the foam layer and the conductive sandpaper which contacts the developer roll. The stiffness of the metal shim in the process direction prevents the foam from deforming in the prenip region and causing the undesirable funnel shape. The prenip region of the present invention is nearly identical to that found with a steel doctor blade. The stiffness of the metal shim also prevents the undesired long, radiused nip geometry and identically mimics the nip geometry of the steel blade. Since the stiffness the shim provides is effective only in the process direction, and not along the length of the developer roller, the overall flexibility of the blade is maintained.

Figure 1:
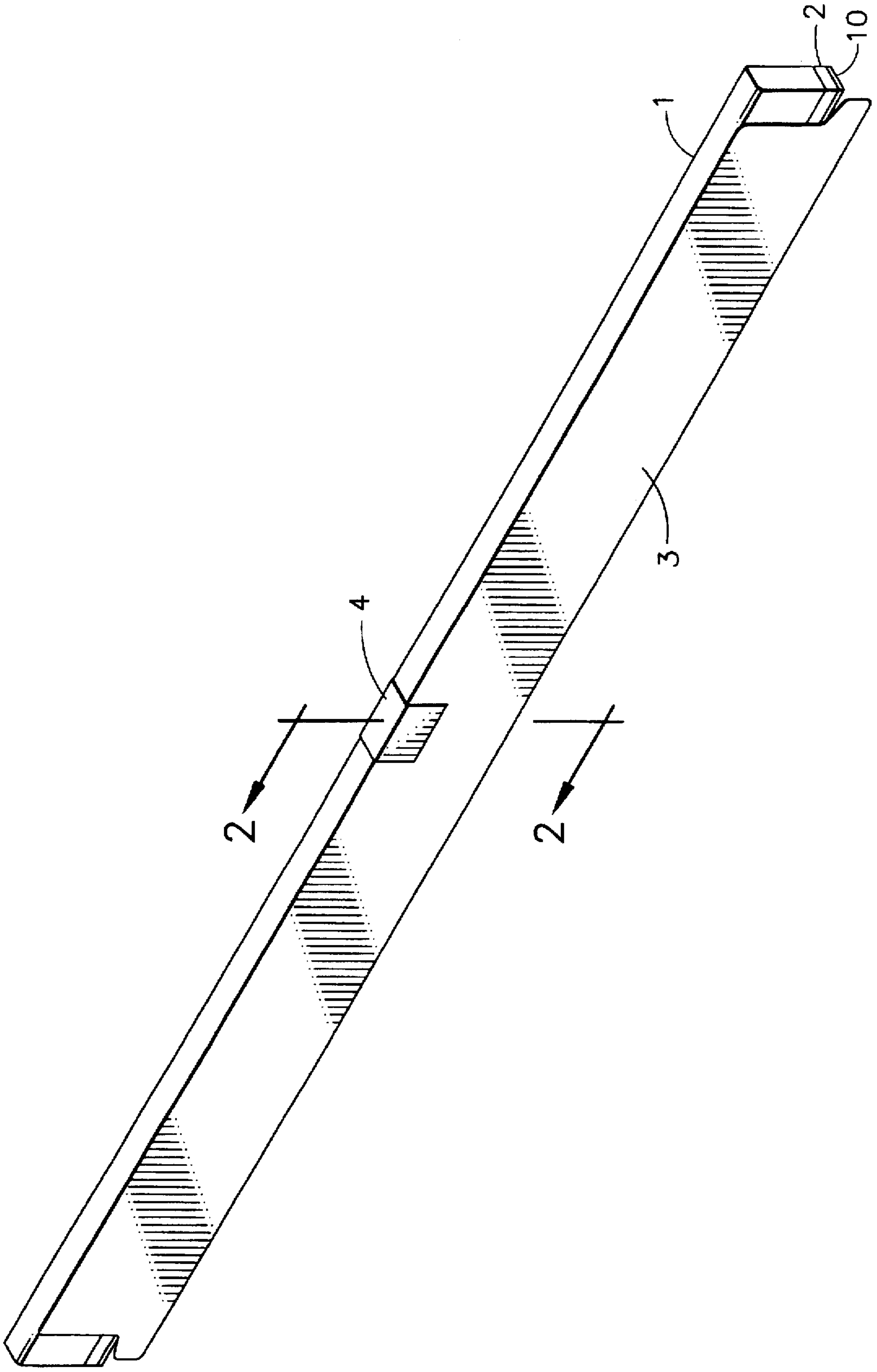
FIG. 1 is a perspective view of the doctor blade.
Figure 2:
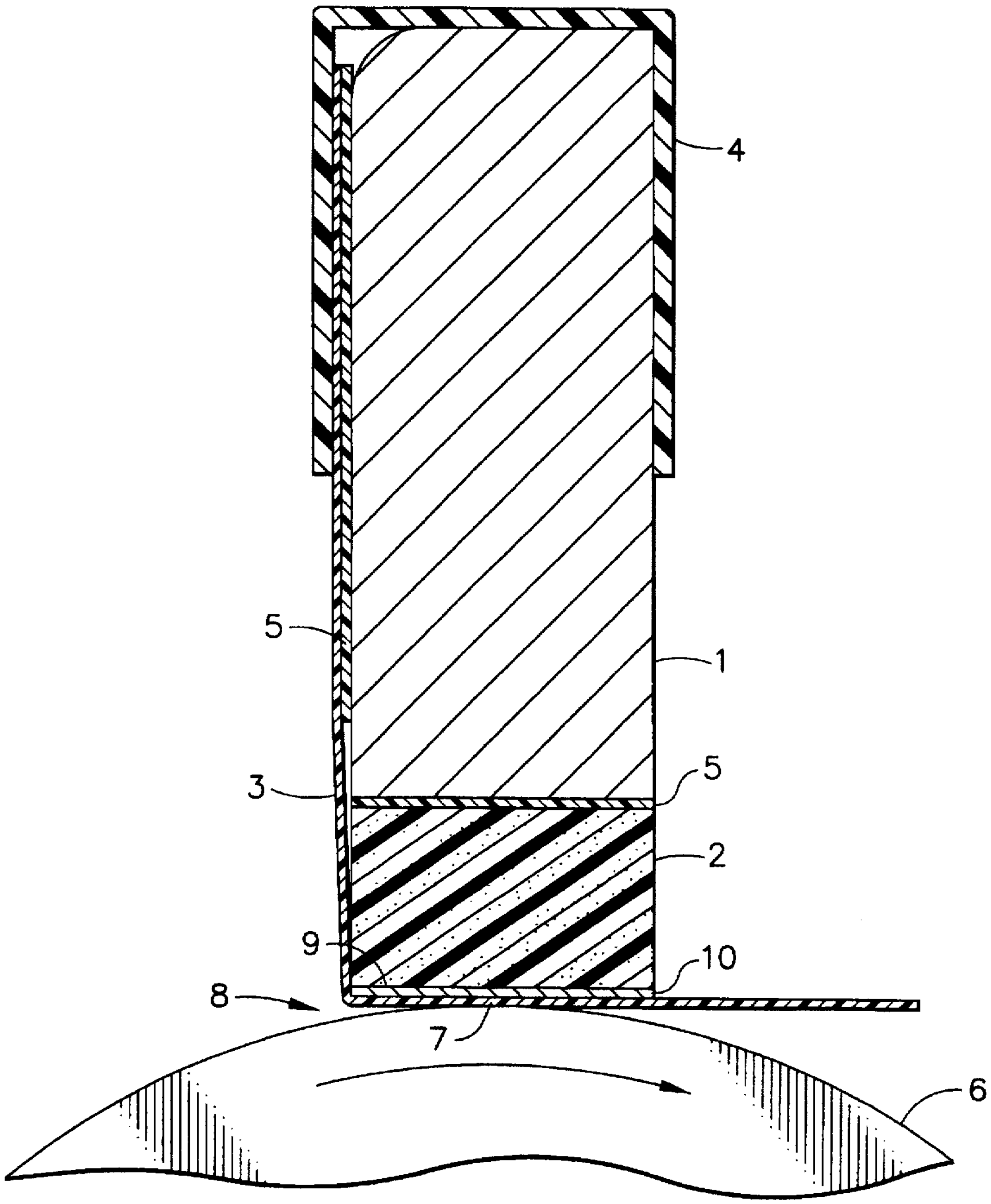
FIG. 2 is a cross-section of the doctor blade (taken along line 2—2) shown with the developer roller in operation.

As shown in FIGS. 1 and 2, the compliant doctor blade of the present invention comprises a support bar (1) of aluminum, preferably, for example, a 4.0 mm×10 mm aluminum 6063-T5 stock bar 231.5 mm in length. Extending the length of bar (1) is a laminate (3) which comprises a compliant backing member carrying on its outside surface (i.e., the surface which contacts the developer roller) a conducting means together with a solid binder having grit particles dispersed throughout the binder. In a preferred embodiment, the compliant backing member is a substrate of compliant polyethylene terephthalate polyester resin film having a thickness of from about 0.002 to about 0.005 inch (i.e., from about 0.051 to about 0.127 mm). Other materials which may be used as the compliant backing member include polyimide and paper. The solid binder which is carried on the compliant backing member is, in a preferred embodiment, a cured polyurethane (e.g., Z001, commercially available from Lord Chemical) having thoroughly dispersed throughout grit particles. These grit particles generally have a particle size of from about 8 to about 20, preferably from about 13 to about 16, micrometers in diameter and are preferably a ceramic oxide, such as silicon carbide (e.g., Norbide, commercially available from Norton Corp.). Other grit materials which are useful in the present invention include aluminum oxide, diamond powder, titanium dioxide, zirconium dioxide, and mixtures thereof.

The compliant backing member also carries a conducting means. This conducting means effectively takes the current which is applied to the doctor blade and conducts it to the developer roller. An example of such a conducting means which may be used in the present invention is the outer metal layer described in U.S. Pat. No. 5,085,171, Aulick, et at., issued Feb. 4, 1992, incorporated herein by reference. A preferred conducting means for use in the present invention is one where conductive particles are included in and dispersed throughout the solid binder layer carried by the compliant backing member. Conductive materials which may be used in the present invention include carbon black, graphite, metal fillers, ionic salts, and mixtures thereof. The preferred conducting material is carbon black. The conducting particles included in the solid binder should provide the layer with an electrical resistance of less than about $2\times10^5$ ohms/cm$^2$.

Laminate (3) is held to bar (1) by any adhesive strong enough to withstand the forces on the laminate. An example of such an adhesive is a commercial dual side adhesive tape (5) comprising 1 mil thick polyester having adhesive on both sides, with total thickness of 0.13 mm, width of 8.5 mm and length coextensive with the length of bar (1).

Developer roller (6) comprises a semiconductive, organic elastomer charged to a predetermined potential by a fixed potential source. Roller (6) is contacted with a supply of charged toner as it rotates clockwise. The toner is normally primarily charged to a polarity the same as the polarity of the roller while having a significant amount of toner charged to the opposite polarity. The sector of developer roller (6) encountering the doctor blade carries such toner, and the toner of opposite polarity is blocked by the charged doctor blade so that only a thin layer of toner passes the doctor blade and that thin layer is charged in great predominance to the correct polarity.

A narrow (preferably about 8 mm wide) conductive band (4) spans bar (1). Band (4) is preferably an approximately 18 mm long section of commercially available copper grounding tape, having a conductive adhesive side which is attached to the laminate (3) across the top of bar (1) and an opposite conductive adhesive side which is attached to bar (1) opposite laminate (3). This band provides an electrical contact between the laminate (3) and bar (1). Laminate (3) is charged through band (4) in the same polarity as roller (6) by a fixed potential source which contacts the back of band (4). An alternative to band (4) is to simply punch a hole in laminate (3) at the location where electrical contact is to be made and fill that hole with a conductive adhesive, such as a silicone or epoxy adhesive, which is then cured to a solid.

In a preferred embodiment the conductive band between bar (1) and laminate (3) is provided by a conductive paste comprising from about 70% to about 96% (preferably about 94% to about 96%) of a flexible elastomer having a hardness of less than about 50 Shore A when dry (such as room temperature vulcanizable silicone or latex rubber) and from about 4% to about 30% (preferably from about 4% to about 6%) of a particulate electrically conductive material (such as carbon black). This paste may also, optionally, include a conventional solvent, such as methyl ethyl ketone. These paste compositions are described in detail in the concurrently-filed patent application entitled "Electrical Contact Material For Flexible Doctor Blade," Bracken, et al.

Located on the bottom surface of support bar (1) (i.e., the face of the support bar which is facing the developer roller) is a layer of resilient foam (2) which generally has a thickness of from about 2 to about 3 mm and runs the entire length of the support bar (1). The foam layer (2) may be attached to the underside of the support bar using any conventional adhesive material which will withstand the forces on the doctor blade during use, but in a preferred embodiment this adhesive material is a commercial dual side adhesive tape (5) which comprises 1 mil thick polyester having adhesive on both sides. A preferred foam material for use in the present invention is Poron foam, a polyurethane foam commercially available from Rogers Corp.

The key aspect of the present invention is the attachment of a shim (10) to the bottom of the resilient foam layer (i.e., the face of the resilient foam layer which faces the developer roller). In selecting the shim it is important that it maintains an appropriate balance between stiffness and flexibility. Specifically, the shim must maintain stiffness in the process direction (i.e., the direction in which the developer roller is moving), yet maintain flexibility in the direction perpendicular to the process direction (i.e., over the length of the doctor blade). It is the stiffness of the shim which provides the appropriate nip configuration, while the flexibility over the length of the doctor blade allows the blade to conform closely to the surface of the developer roller. Thus, the doctor blade of the present invention provides the benefits of both an inflexible steel doctor blade and a flexible doctor blade. Any material which maintains this appropriate flexibility/stiffness balance may be used as the shim in the present invention. In deciding whether a particular material is appropriate for use as the shim, both the nature of the material and its thickness will be important. Specifically, if a material is too thin it may not provide the appropriate degree of stiffness required, while if it is too thick it may not exhibit the required degree of flexibility. The shim may be made of any material having the required flexibility/stiffness tradeoff and is preferably a material that does not corrode and has an appropriate cost. Examples of materials which may be used include brass, phosphorus bronze, beryllium copper, polycarbonate, polyester, and stainless steel. Polyester is a particularly preferred material because it is easier than the metals to cut into the desired shape. Stainless steel is also a preferred material because of its attractive cost and the fact that it doesn't corrode.

By way of example, when stainless steel is used to make the shim, a, thickness below about 0.004 inch (0.102 mm) makes the shim too fragile. When polyester (e.g., Mylar, commercially available from DuPont) is used, a thickness of material below about 0.014 inch (0.356 mm) makes the material too flexible; greater stiffness is required. On the other hand, stainless steel at a thickness of greater than about 0.012 inch (0.305 mm) is too thick and does not provide the required degree of flexibility. Thus, the thickness for the shim material selected is purely a function of the stiffness/flexibility tradeoff required. The shim material utilized in the doctor blades of the present invention should have a stiffness of from about 0.5 to about 31.0, preferably from about 10.0 to about 25.0, inches of deflection/inch of length/pound of force. This stiffness is measured as follows: a 4 mm wide shim is fixed at one end and loaded at the other (the magnitude of the load should be sufficiently low to prevent plastic deformation of the shim); the displacement of the loaded end is then measured. Put another way, the shim should have a stiffness which is greater than that of 0.014 inch thick polyester and less than or equal to that of 0.012 inch thick stainless steel.

The placement of the shim (10) on the foam layer (2) is important. Specifically, the shim (10) should be aligned with the front edge (9) of the doctor blade (i.e., the edge of the doctor blade which the developer roller encounters first in use). The shim (10) should run the entire length of the doctor blade. It is fastened onto the foam layer (2) using an adhesive that cures and sets up over time. It is important that the adhesive not allow the shim to creep or shift position in use. This is particularly important since the shim will be under constant shear stress during use. Examples of useful adhesives include acrylic adhesives. It is preferred that the shim be fastened to the foam using an acrylic adhesive (e.g., #9469 Double Sided Tape commercially available from 3M). It is not necessary that the shim cover the entire bottom face of the foam layer, as long as it is placed at and aligned with the front edge (9) of the foam layer (2). However, it is preferred that the shim be of such size and placement that it covers the entire bottom face area of the foam layer since that makes assembly and alignment of the doctor blade much easier.

The doctor blade of the present invention may be formed in an embodiment where a portion of the support bar (1) extends down along the foam layer (2) and ends in a position aligned with the shim (10) such that it forces the laminate (3) to turn substantially directly toward the nip areas at the base of that extension of the bar, resulting in a reduction in the size of the wedge areas between the doctor blade and the developer roller where toner can accumulate. This type of structure is described in U.S. patent application Ser. No. 08/524,275, Bracken, et al., Extended Life Compliant Doctor Blade, filed Sep. 6, 1995.

The resilient foam layer (2) may be made from any commercially available foam having the appropriate degree of resilience. Preferably, the foam (2) is a commercially available polyurethane foam having a density of about 20 lbs. per cubic foot. The foam (2) is held in place by a double side adhesive tape (5) which is approximately 4 mm in width and 0.013 mm thick. Various alternatives to foam (2) may be readily employed. In use, when the laminate on the compliant backing member (3) is bent back as described, the inherent resilience of the foam material and the backing member provides the force for the laminate layer (3) toward the roller (6).

A preferred laminate (3) is made by curing a slurry of a thorough mixture of silicon carbide grit, conductive carbon black and polyurethane-based adhesive applied as a thin coating (e.g., from about 25 to about 35 microns thick) to the resin substrate (i.e., the compliant backing member) which may be from about 0.002 to about 0.005 inch (i.e., about 0.051 to about 0.127 mm) thick. This slurry is cured to form a conductive layer. The carbon black provides the conductivity. Type XE-2 carbon black, a product of Degussa, is preferred for use in the present invention. A peak response in electrical properties is obtained by loading about 5% by volume of carbon black in the slurry, which results in an electrical resistance less than about $2\times10^5$ ohms/cm$^2$, preferably less than about $1\times10^5$ ohms/cm$^2$. Loading higher than about 5% by weight results in a surface roughness which is too smooth for the correct metering of toner, regardless of the size of the abrasive particles.

There is a peak response in the doctoring performance using abrasive particles in the 13–16 micrometer diameter range. This grit size yields an average roughness of from about 0.9 to about 1.1 micrometer Ra. Particle sizes smaller than about 13 micrometer in diameter can result in a surface that is too smooth, allowing excessive toner to be metered under the doctor blade. Particle sizes larger than about 16 micrometers in diameter result in a surface that is too rough, allowing too little toner under the doctor blade. Also, larger particle sizes create peaks on the surface which scrape too much toner from the surface of the developer roller in a narrow area, resulting in vertical streaks on the printed page. Any type of ceramic oxide grit may be used in the present invention. Examples of such materials include silicon carbide, aluminum oxide, diamond powder, zirconium dioxide, and titanium dioxide within the particle size range specified herein. By being conductive throughout, as the conductive/grit lamination wears from the compliant backing member, the electrical properties of the doctor blade remain consistent.

The doctor blade of the present invention is shown in use in FIG. 2. In use, laminate (3) is compliant and is simply bent back at a position contiguous to the developer roller (6) as it rotates. The compliant backing member (3) and the resilient foam layer (2) provide the force which holds the conductive/grit laminate against the developer roller (6). The stiffness of the shim (10) in the direction that the roller is turning prevents the front edge (9) of the foam from deforming; this provides a prenip region having an optimal shape (8). This prenip region is nearly identical to that seen with a steel doctor blade. The stiffness of the shim also prevents the undesired long, radiused nip geometry and identically mimics the short, flat nip geometry of a steel blade (7). The stiffness that the shim provides is effective only in the process direction and not along the length of the blade (i.e., the length of the roller), thereby maintaining the overall flexibility of the blade. This is due to the narrowness of the blade (preferably about 4 mm), the width of the nip (i.e., from about 0.5 to about 1.5 mm, preferably about 1 mm), and the overall length of the blade (from about 230 to about 233 mm, preferably about 231.5 mm). The preferred thickness of the shim is about 0.014 inches (0.356 mm). The preferred material is polyester.

Variations in the form and in the materials used are readily visualized and would be within the contemplation of this invention. Coverage is sought as provided by law, with particular reference to the accompanying claims.

What we claim is:

1. An electrically energized doctor blade for metering charged electrophotographic toner held on a developer roller by physically contacting a sector of said roller with a surface of said blade which is electrically charged, said blade comprising a compliant backing member, a supporting member to position said blade adjacent to said roller, a compliant foam layer attached to the side of said supporting member facing the developer roller, a shim having a stiffness of from about 0.5 to about 31.0 inches of deflection/inch of length/pounds of force attached to the side of the compliant foam layer facing the developer roller, and a layer on said compliant backing member comprising conducting means and a solid binder having dispersed throughout said binder grit particles, said compliant backing member, said conducting means and said layer with grit being attached to said supporting member and being bendable to extend under said foam layer and shim to contact said layer with grit and said conducting means with said sector of said developer roller during use.

2. The doctor blade according to claim 1 wherein the conducting means is a conductive filler dispersed in the binder layer carried on the compliant backing member.

3. The doctor blade according to claim 2 wherein the shim is fastened at the front edge of the foam layer and extends the full length of the foam layer.

4. The doctor blade according to claim 3 wherein the stiffness of the shim is greater than that of 0.014 inch thick polyester and less than or equal to that of 0.012 inch thick stainless steel.

5. The doctor blade according to claim 4 wherein the shim is made from a material selected from the group consisting of brass, polyester, stainless steel, phosphorus bronze, beryllium copper and polycarbonate.

6. The doctor blade according to claim 5 wherein the grit has a particle size of from about 8 to about 20 micrometers in diameter.

7. The doctor blade according to claim 6 wherein the grit particles have a size of from about 13 about 16 micrometers in diameter.

8. The doctor blade according to claim 7 wherein the grit is a ceramic oxide.

9. The doctor blade according to claim 8 wherein the conductive filler is used in an amount to provide an electrical resistance for the binder grit layer of less than about $2\times10^5$ ohms/cm$^2$.

10. The doctor blade according to claim 9 wherein the conductive filler is carbon black.

11. The doctor blade according to claim 10 wherein the shim substantially covers the face of the foam layer facing the developer roll.

12. The doctor blade according to claim 11 wherein the shim is fastened to the developer roll using an acrylic adhesive.

13. The doctor blade according to claim 12 wherein the shim is made from stainless steel.

14. The doctor blade according to claim 13 wherein the shim has a thickness of about 0.005 inch.

15. The doctor blade according to claim 12 wherein the shim is made from polyester.

16. The doctor blade according to claim 15 wherein the shim has a thickness of about 0.014 inch.

17. The doctor blade according to claim 10 wherein the supporting member includes an extension from a body of said supporting member ending at a position at which said compliant backing member and said layer with grit and conductive filler when bent toward said sector turns substantially directly toward said sector.

18. The doctor blade according to claim 5 wherein the shim is fastened to the foam layer using an acrylic adhesive.

19. The doctor blade according to claim 18 wherein the shim is made from polyester.

20. The doctor blade according to claim 19 wherein the shim has a thickness of about 0.014 inches.

* * * * *